(12) United States Patent
Verouden et al.

(10) Patent No.: US 11,246,317 B2
(45) Date of Patent: Feb. 15, 2022

(54) MOULDING DEVICE AND METHOD FOR MOULDING

(71) Applicant: MAREL FURTHER PROCESSING B.V., Boxmeer (NL)

(72) Inventors: Franciscus Quirinus Fredrik Verouden, Sint Anthonis (NL); Dirk Meskendahl, Kranenburg (DE); Johannes Martinus Meulendijks, Deurne (NL); Wilhelmus Johannes Jacobus Maria Van Der Straaten, Sambeek (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 298 days.

(21) Appl. No.: 16/308,286

(22) PCT Filed: Jun. 6, 2017

(86) PCT No.: PCT/NL2017/050367
§ 371 (c)(1),
(2) Date: Dec. 7, 2018

(87) PCT Pub. No.: WO2017/213496
PCT Pub. Date: Dec. 14, 2017

(65) Prior Publication Data
US 2019/0289862 A1 Sep. 26, 2019

(30) Foreign Application Priority Data
Jun. 9, 2016 (NL) .................................. 2016928

(51) Int. Cl.
*A22C 7/00* (2006.01)
*A23P 30/10* (2016.01)
(Continued)

(52) U.S. Cl.
CPC .............. *A22C 7/0069* (2013.01); *A22C 7/00* (2013.01); *A22C 7/0092* (2013.01); *A23P 30/10* (2016.08);
(Continued)

(58) Field of Classification Search
CPC ..... A22C 7/0069; A22C 7/0092; B29C 39/04; B29C 39/06; B29C 43/3697
See application file for complete search history.

(56) References Cited

U.S. PATENT DOCUMENTS

| 3,490,391 A | 1/1970 | Vogt | |
| 2005/0220932 A1* | 10/2005 | van der Eerden | ...... A23P 30/10 426/1 |
| 2014/0199423 A1* | 7/2014 | Righolt | ................ A22C 7/0069 425/142 |

FOREIGN PATENT DOCUMENTS

| AU | 734662 B2 | 6/2001 |
| WO | WO 98/12934 A1 | 4/1998 |

(Continued)

OTHER PUBLICATIONS

Translation of WO 98/12934 (Year: 1998).*
(Continued)

*Primary Examiner* — Marc C Howell
*Assistant Examiner* — John J DeRusso
(74) *Attorney, Agent, or Firm* — Birch, Stewart, Kolasch & Birch, LLP

(57) ABSTRACT

A moulding device and a method for moulding food products from a mass of foodstuff which can be transferred by pumping are provided. The device includes a stationary frame with a revolving moulding drum assembly having a peripheral surface in which mould cavities are provided, and a mass feed device including a shoe member with a filling mouth adjoining the peripheral surface of the moulding drum assembly in order to fill said cavities with the foodstuff (Continued)

as they move past. In operation, the pressurized mass of foodstuff introduced into a mould cavity causes an outward force onto said shoe member. A non-revolving component is provided, concentrically supported by the moulding drum assembly, including the shoe member and an interconnected moulding drum assembly engaging counterforce element to counteract the entire outward force exerted by the pressurized foodstuff on the shoe member.

9 Claims, 6 Drawing Sheets

(51) Int. Cl.
*B29C 31/04* (2006.01)
*B29C 33/42* (2006.01)
*B29C 39/04* (2006.01)
*B29C 39/24* (2006.01)
*B29C 43/08* (2006.01)

(52) U.S. Cl.
CPC .............. *B29C 31/04* (2013.01); *B29C 33/42* (2013.01); *B29C 39/04* (2013.01); *B29C 39/24* (2013.01); *B29C 43/08* (2013.01)

(56) References Cited

FOREIGN PATENT DOCUMENTS

| WO | WO 00/30458 A1 | 6/2000 | |
|---|---|---|---|
| WO | WO 2004/002229 A2 | 1/2004 | |
| WO | WO 2010/110655 A1 | 9/2010 | |
| WO | WO 2014/148897 A2 | 9/2014 | |
| WO | WO-2015012690 A2 * | 1/2015 | ........... A22C 7/0069 |

OTHER PUBLICATIONS

Intenational Search Report, issued in PCT/NL2017/050367, dated Oct. 4, 2017.
Written Opinion of the International Searching Authority, issued in PCT/NL2017/050367, dated Oct. 4, 2017.

* cited by examiner

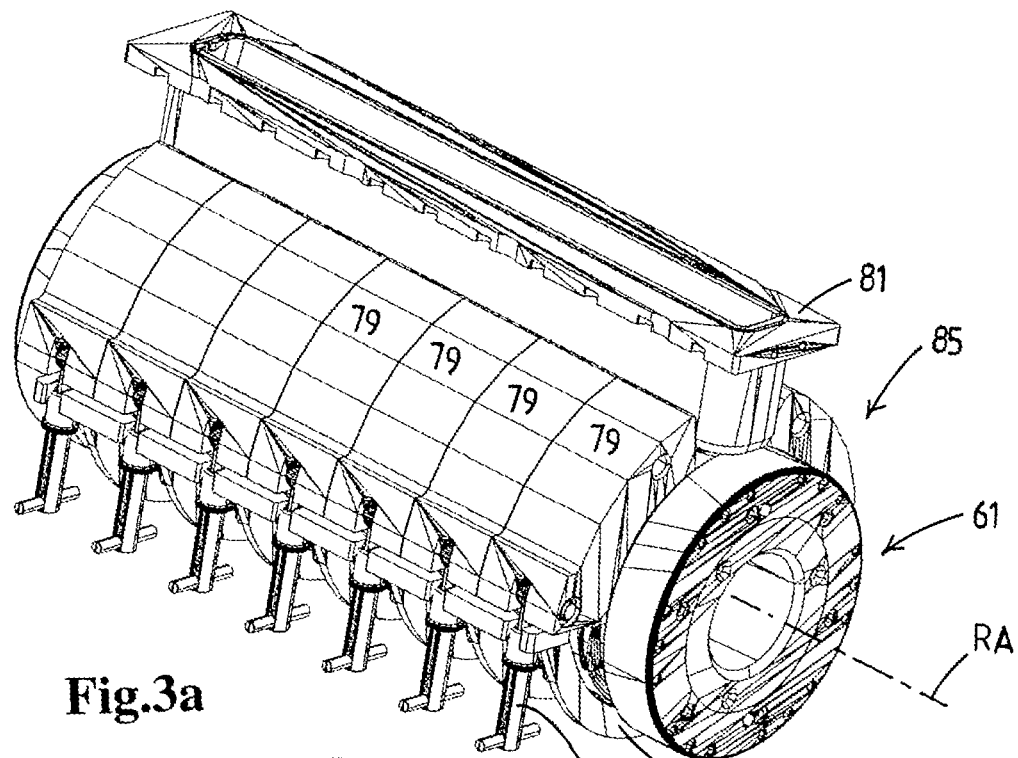
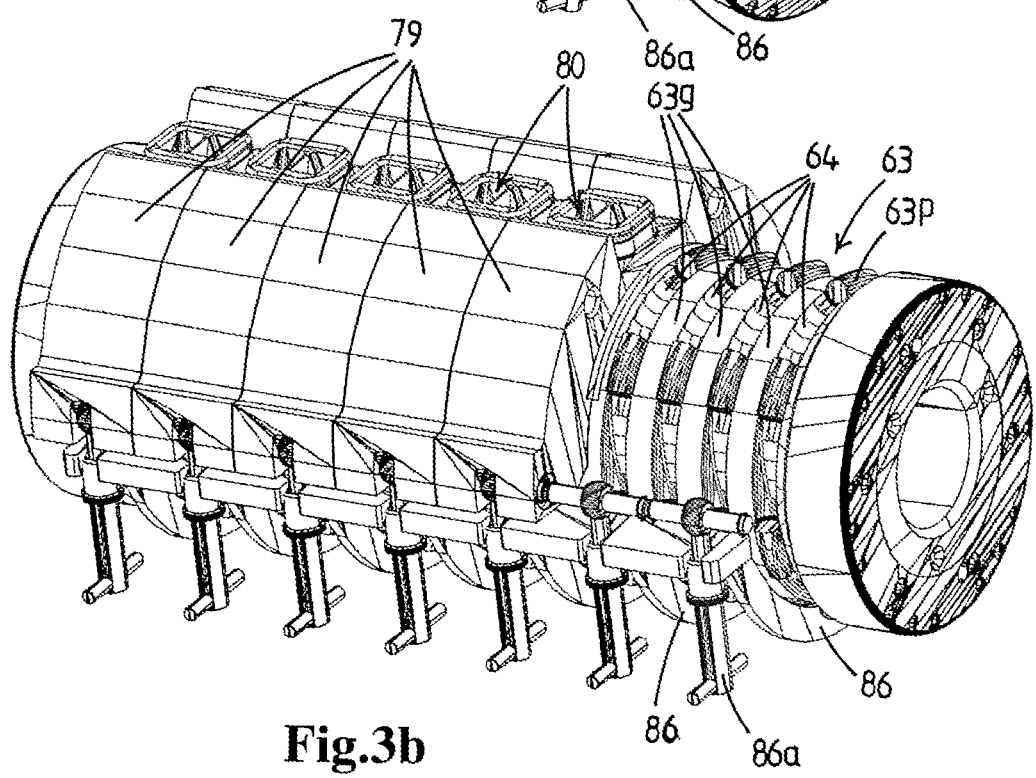

MOULDING DEVICE AND METHOD FOR MOULDING

FIELD OF THE INVENTION

The present invention relates to a moulding device and a method for moulding food products from a mass of foodstuff which can be transferred by pumping, for example a mass of minced meat.

BACKGROUND OF THE INVENTION

Such a moulding device is known e.g. from WO2004002229 and WO2010110655 and WO2014148897 of the same applicant. These known moulding devices comprise:
- a stationary frame;
- a revolving moulding drum assembly having a peripheral surface in which one or more mould cavities are provided, wherein the cavities each define a filling opening in the peripheral surface;
- a rotary bearing assembly supported by the stationary frame and rotatably supporting the moulding drum assembly about a longitudinal drum rotation axis;
- a drive motor to drive the moulding drum assembly;
- a mass feed device arranged in a filling position with respect to the peripheral surface of the moulding drum assembly; the mass feed device comprising:
  - an inlet member for feeding a pressurized mass of foodstuff;
  - a shoe member in communication with the inlet member, comprising a filling mouth which adjoins the peripheral surface of the moulding drum assembly in such a way that the filling opening of the one or more mould cavities which move past during rotation of the moulding drum assembly come into communication with said filling mouth in order to fill said cavities with the foodstuff as they move past;

wherein, in operation, the pressurized mass of foodstuff introduced into a mould cavity causes an outward force onto said shoe member.

In the known devices, the mass feed device comprising the inlet member and shoe member, and possibly also a pump and a silo for receiving the mass of foodstuff, is supported by a stationary frame. The stationary frame is a fixed frame, and possibly the same stationary frame as the frame supporting the rotary bearing assembly. As the shoe member is part of the mass feed device, it is supported by the stationary frame to absorb the outward force generated by the foodstuff.

In WO2004002229 it is described that the mass feed device comprises a shoe member supported by a housing, which shoe member is designed to adapt to irregularities in the outer circumference of the drum, even when the drum is not perfectly cylindrical, so that loss of mass is limited and leakage during the application of a vacuum and/or pressure is avoided. For this purpose, the shoe member is flexible to a certain degree, so that it is able to follow any deviations. In particular, the shoe member comprises a flexible plate which is held against the peripheral surface under pressure produced by excess-pressure means. The excess-pressure means e.g. comprise at least one pressure cushion and a number of lamellae, which are positioned transversely with respect to the direction of rotation of the moulding drum assembly, and which are arranged between the pressure cushion and the plate.

A disadvantage of the known shoe members supported by a stationary rigid frame or housing is that the generation of outward forces and absorption by the rigid frame results in a net force exerted onto the relatively weak moulding drum assembly, resulting in deformation of the moulding drum assembly, in particular of the rotation axis of the moulding drum assembly. When the moulding drum assembly is supported at one end, the rotation axis may be deformed to be angled downwards towards the non-supported end. In case of a moulding drum supported at both ends, the rotation axis may be bent downwards in the central part thereof.

SUBJECT OF THE INVENTION

The aim of the present invention is to provide an alternative configuration.

According to the present invention, the moulding device comprises:
- a non-revolving component, concentrically supported by the moulding drum assembly adjacent to the peripheral surface thereof, comprising the shoe member and an interconnected moulding drum assembly engaging counterforce element to counteract the outward force exerted by the pressurized foodstuff on the shoe member;
- an anti-torque member to prevent rotation of the non-revolving component.

Further, a non-force transmitting flexible connection is provided between the shoe member and the inlet member, such that force transmittal from the shoe member to the inlet member is not possible.

In particular, the moulding device comprises:
- a non-revolving component, concentrically supported by the moulding drum assembly and not by the stationary frame, which non-revolving component is provided adjacent and movable in a radial direction to the peripheral surface; the non-revolving component comprising the shoe member and an interconnected moulding drum assembly engaging counterforce element to counteract the entire outward force exerted by the pressurized foodstuff on the shoe member;
- an anti-torque member to prevent rotation of the non-revolving component, while allowing flexibility in the radial direction;

The present invention further relates to a method for moulding food products from a mass of foodstuff which can be transferred by pumping, for example a meat mass of minced meat, wherein use is made of such a moulding device.

Hence, according to the claimed invention, the entire outward force generated by the foodstuff is counteracted by a counterforce element, instead of being absorbed by a fixed frame. The shoe member, which is known per se, is according to the claimed invention part of the non-revolving component, which is concentrically supported by the moulding drum assembly adjacent and movable in a radial direction to the peripheral surface thereof, and hence no longer by the frame. To ensure this, a non-force transmitting flexible connection is provided between the shoe member and the inlet member, such that force transmittal of the outward force exerted by the pressurized foodstuff on the shoe member to the inlet member is not possible.

The advantage of the configuration of the claimed invention is that there is no net force exerted onto the moulding drum assembly, resulting in a reduced load on the rotary bearing assemblies.

The anti-torque member is provided to prevent rotation of the non-revolving component. In embodiments, the anti-torque member is provided between the non-revolving component and the stationary frame. Alternatively the anti-torque member is provided between the non-revolving component and an alternative stationary element, such as a support onto which the moulding device is positioned, or part of the mass feed device which is provided stationary, e.g. a pump. It is noticed that no force transmittal of the outward force exerted by the pressurized foodstuff on the shoe member is possible via the anti-torque member.

In embodiments, the shoe member and the counterforce element of the non-revolving component are interconnected at one end only, forming an essentially C-shaped non-revolving element. Alternatively, the shoe member and the counterforce element are interconnected at both ends to form a ring-shaped non-revolving component.

According to the invention, the shoe member and counterforce element are interconnected to form the non-revolving component. In embodiments, the shoe member and counterforce element are directly connected. In alternative embodiments, connectors are provided to connect the shoe member and the counterforce element to form the non-revolving component. Possibly, one or more connection beams extending parallel to the drum rotation axis are provided to which one or more shoe members are connected on the one hand, and one or more counterforce element are connected on the other hand.

In order to effectively counteract the outward force exerted by the pressurized foodstuff on the shoe member, the counterforce element is provided generally opposite the non-revolving component. In embodiments, the shoe member and the counterforce element are positioned radially opposite one another. This configuration is advantageous in view of the distribution of forces, but alternative configurations wherein the counterforce element is not provided radially opposite the shoe member are also within the scope of the present invention. An exemplary alternative configuration of the non-revolving component is horse-shoe shaped, with the shoe member centrally at the upper end thereof, while two counterforce elements are formed at the distal legs thereof, thus provided generally opposite but not radially opposite the shoe member.

In embodiments, the shoe member and the counterforce element are positioned in line with each other, viewed in the direction of the rotation axis. With such a counterforce element opposite the shoe member, account has to be taken of the discharge of the moulded food products, as generally the discharge takes place radially opposite the filling. With the above-described horse-shoe-shaped non-revolving component the moulded food products can be discharged in the open end between the distal legs. In alternative embodiments, the counterforce element is provided with a discharge opening for moulded products.

In alternative embodiments, the shoe member and the counterforce element are positioned offset, viewed in direction of the rotation direction. A connection beam or pin, parallel to the direction of the rotation axis may connect the offset shoe member(s) and counterforce element(s). In such a configuration, the counterforce element can be positioned remote from a discharge region for discharging moulded food products.

In an advantageous embodiment, the non-revolving component comprises two counterforce elements, provided at opposed ends of the moulding drum assembly.

In an alternative advantageous embodiment, the non-revolving component comprises multiple counterforce elements, equally distributed over the length of the revolving moulding drum assembly.

In embodiments, between the counterforce element of the non-revolving component and the moulding drum assembly a bearing is provided, e.g. a roller bearing, ball bearing or plain bearing with a lubricant.

In embodiments, the bearing is pressurized, e.g. by a spring, to actively press the shoe member to adjoin the peripheral surface of the moulding drum assembly. When pressurized, the shoe member is designed to adapt to irregularities in the outer circumference of the drum, even when the drum is not perfectly cylindrical, so that loss of mass is limited and leakage during the application of a vacuum and/or pressure is avoided. Alternative pressure devices are also conceivable, such as the cushions and lamellae configuration of WO2004002229.

Advantageously, the shoe member is flexible to a certain degree, so that it is able to follow any deviations. It is conceivable that the shoe member comprises a flexible plate which is held against the peripheral surface, and is pressurized by the bearing between the counterforce element and the moulding drum assembly.

In embodiments, the non-revolving component further comprises a moulding drum assembly engaging scraper, provided after discharge of a moulded product seen in direction of rotation, to scrape foodstuff remnants from the peripheral surface.

The frame of the moulding device of the invention is provided stationary, i.e. fixed to a support. The drive motor is generally supported by the frame, or provided in the frame. The moulding drum assembly is driven by means of the drive motor. A rotary bearing assembly, e.g. comprising roller bearings, is supported by the frame, and provided between the frame and a revolving moulding drum assembly.

In an embodiment, the moulding drum assembly comprises a rotating shaft, connected to the drive motor to allow rotation of the moulding drum assembly. The rotating shaft is rotatably supported relative to the frame via the rotary bearing assembly. Possibly, a rotating bearing is provided adjacent the drive motor in the frame. It is both conceivable that the rotating shaft is supported at one end only, or at both ends, or possibly also at an intermediate area.

In an alternative embodiment, a stationary spindle is fixed to the frame, and the rotary bearing assembly is provided between the spindle and the moulding drum assembly. The drive motor allows the moulding drum assembly to revolve about the spindle.

The rotary bearing assembly rotatably supports the moulding drum assembly about a longitudinal drum rotation axis. Generally, the rotation axis is substantially horizontal. Possibly, the rotation axis may be slightly angled with respect to the horizontal. In particular, it is conceivable that the rotation axis is slightly bended. When the moulding drum assembly is supported at one end, the rotation axis may be angled downwards towards the non-supported end. In case of a moulding drum supported at both ends, the rotation axis may be bent downwards in the central part thereof.

The moulding drum assembly has a peripheral surface in which one or more mould cavities are provided. The moulding drum assembly has a cylindrical outer contour with a peripheral surface, in which generally multiple mould cavities are provided. In embodiments, multiple mould cavities are arranged in the peripheral surface in a mould cavities pattern, e.g. an array of mould cavities.

A row of cavities comprises cavities may be arranged at multiple longitudinal positions when seen in longitudinal (axial) direction of the moulding drum assembly, i.e. in the direction of the rotation axis. In embodiments, multiple rows of mould cavities are provided, e.g. 5-10 rows. Preferably, the filling openings of a row of cavities come into communication with a filling mouth of the shoe member.

A series of cavities comprises cavities may be arranged at multiple peripheral positions when seen in peripheral (circumferential) direction of the moulding drum assembly. In embodiments, multiple series of mould cavities extend in the peripheral direction, wherein said series extend substantially parallel to and at a distance from one another, viewed in the direction of the rotation axis. Each series may comprise multiple mould cavities which are at a distance from one another, viewed in the peripheral direction of the peripheral surface of the moulding drum assembly. Advantageously, the mould cavities of multiple series are aligned in rows.

The moulding device further comprises a mass feed device arranged in a filling position with respect to the peripheral surface of the moulding drum. In operation, the mass feed device feeds a pressurized mass of foodstuff to the one or more mould cavities.

The mass feed device comprises an inlet member for feeding a pressurized mass of foodstuff. Possibly, the mass feed device further comprises a pump to generate the pressurized mass of foodstuff, and a silo for receiving the mass of foodstuff. These parts of the mass feed device are generally supported by a stationary frame. The stationary frame is a fixed frame, and possibly the same stationary frame as the frame supporting the rotary bearing assembly.

The mass feed device further comprises a shoe member in communication with the inlet member, comprising a filling mouth which adjoins the peripheral surface of the moulding drum assembly. In embodiments, a shoe member comprises multiple filling mouth.

According to the invention, the shoe member is supported by the moulding drum assembly. In particular, a non-force transmitting flexible connection is provided between the shoe member and the inlet member, such that force transmittal from the shoe member to the inlet member is not possible. Such a flexible connection is e.g. formed by a flexible hose.

During operation, the filling opening of the one or more mould cavities which move past during rotation of the moulding drum assembly come into communication with said filling mouth in order to fill said cavities with the foodstuff as they move past.

In embodiments, the mass feed device further comprises a distributor between the shoe member and the inlet member, wherein the inlet member is provided adjacent a pump. The flexible connection may be provided between the shoe member and the distributor, or between the distributor and the inlet member.

In embodiments, a single shoe member is provided extending over the longitudinal length of the peripheral surface of the moulding drum assembly. As such, it is possible that a single shoe member is adapted to come into communication with one row of cavities at the time.

In alternative embodiments, the non-revolving component comprises multiple shoe members, provided substantially parallel to and adjacent one another, viewed in the direction of the rotation axis, each shoe member having a filling mouth adjoining an associated section of the peripheral surface of the moulding drum assembly in which a series of cavities is arranged at multiple peripheral positions when seen in peripheral direction of the moulding drum assembly. The filling mouth of each shoe member is preferably provided adjacent one or two series of cavities, which move past the associated shoe member during rotation of the moulding drum assembly come into communication with said associated shoe member in order to fill said cavities of said series with the foodstuff as they move past.

Preferably the multiple shoe members are provided floating in the direction of the rotation axis, such that each shoe member is free to align itself relative to the moulding drum assembly. This may e.g. compensate for misalignment caused by fitting errors and thermal expansion or contraction.

In embodiments, the peripheral surface of the moulding drum assembly is embodied as a profiled peripheral surface having a shaping profile which comprises, for each series of cavities arranged at multiple peripheral positions when seen in peripheral direction of the moulding drum assembly, projections between multiple pairs of successive cavities of said series and/or one or more peripheral grooves which extend in the peripheral direction between and through the successive cavities of said series.

Advantageously, an inner side of each shoe member which adjoins an associated section of the peripheral surface of the moulding drum assembly is embodied as a profiled inner side having a profile which section comprises, for each series of cavities, one or more grooves extending in the peripheral direction and/or ribs extending in the peripheral direction, which grooves and/or ribs are in meshing engagement with the profiled peripheral surface of said section of the moulding drum. As such, each floating shoe member is able to align itself relative to a section of the moulding drum via the meshing configuration.

The present invention further relates to a non-revolving component, adapted to be concentrically supported by a moulding drum assembly adjacent and movable in a radial direction to a peripheral surface thereof, comprising:
  one or more shoe members of a mass feed device which is adapted to be arranged in a filling position with respect to the peripheral surface of the moulding drum assembly to adjoin and be movable in a radial direction to the peripheral surface of the moulding drum assembly, wherein the one or more shoe members are in communication with an inlet member of the mass feed device, each of the one or more shoe members comprising a filling mouth which is adapted to adjoin the peripheral surface of the moulding drum assembly in such a way that the filling opening of the one or more mould cavities which move past during rotation of the moulding drum assembly come into communication with said filling mouth in order to fill said cavities with the foodstuff as they move past; and
  an interconnected moulding drum assembly engaging counterforce element to counteract the entire outward force exerted by the pressurized foodstuff on the shoe member.

In embodiments, the non-revolving component further comprises connection beams extending parallel to the drum rotation axis, to which one or more shoe members are connected adjacent filling openings in the peripheral surface of the moulding drum assembly, and to which one or more moulding drum assembly engaging counterforce elements are connected. Possibly, two moulding drum assembly engaging counterforce elements are provided at the ends of the connection beams adjacent the peripheral surface at the ends of the moulding drum assembly, preferably remote from the filling openings.

The present invention further relates to the combination of the above-described non-revolving component and an anti-torque member to prevent rotation of the non-revolving component.

The present invention further relates to the combination of the above-described non-revolving component and a revolving moulding drum assembly having a peripheral surface in which one or more mould cavities are provided, wherein the cavities each define a filling opening in the peripheral surface.

The present invention also relates to the combination of a revolving moulding drum assembly and an associated non-revolving component for use in a moulding device for the moulding of food products, wherein the drum assembly has a rotation axis and a peripheral surface in which mould cavities are provided, wherein the cavities each define a filling opening in the peripheral surface, and wherein said moulding drum comprises first and second end parts, e.g. each embodied as a rotation symmetrical surface, at opposite axial ends of said peripheral surface in which mould cavities are provided, wherein the non-revolving component has a connection subframe with a first counterforce element and a second counterforce element at axial ends thereof, wherein said first counterforce element cooperates with said first end part via a first bearing, e.g. via one or more rollers that roll over a rotation symmetrical surface, and wherein said second counterforce element cooperates with said second end part via a second bearing, e.g. via one or more rollers that roll over a rotation symmetrical surface, wherein said subframe carries one or more shoe members. For example each of said first and second bearing comprises or is formed by a set of two rollers engaging a respective rotation symmetrical surface at a respective axial end of the drum, the two rollers of a set being spaced apart in circumferential direction.

Possible aspects of the non-revolving component described in relation to the invention directed to the moulding drum are also deemed to relate to the non-revolving component per se, or to the combination.

The present invention further relates to a non-revolving component for use in a moulding device according to any of the claims.

BRIEF DESCRIPTION OF THE DRAWINGS

The invention will be elucidated further in relation to the attached drawings, in which:

FIG. 3a is a perspective view of part of a third embodiment of a moulding device according to the present invention;

FIG. 3b shows part of the embodiment of FIG. 3a;

FIG. 3c shows the non-revolving component of the embodiment of FIG. 3a;

FIG. 4b shows part of the embodiment of FIG. 4a;

DETAILED DESCRIPTION OF THE EMBODIMENTS

Figure 1:
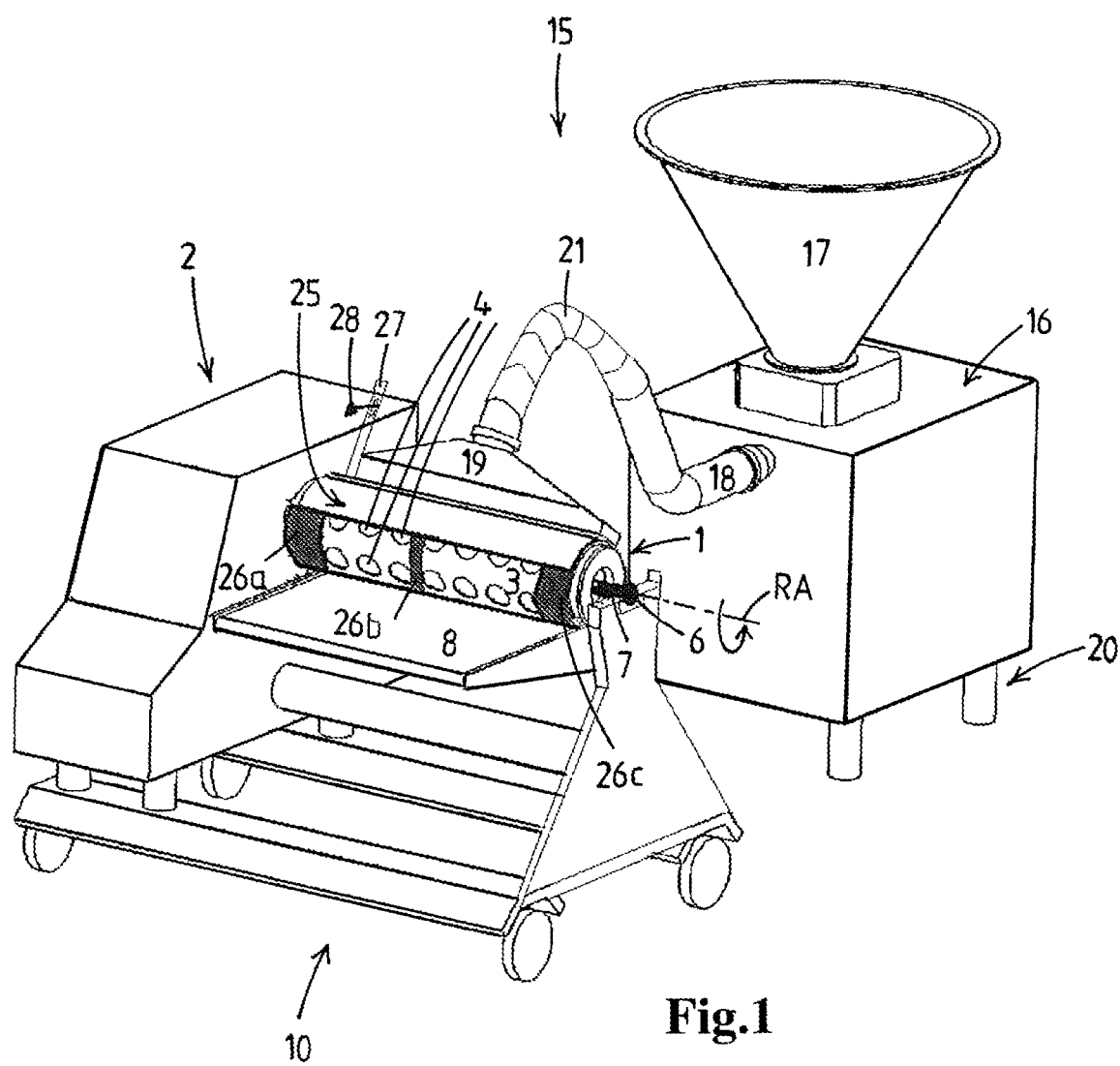
FIG. 1 is a perspective view of a first embodiment of a moulding device according to the present invention.

In FIG. 1 a first embodiment of a moulding device 10 for moulding food products from a mass of foodstuff which can be transferred by pumping, for example a meat mass of minced meat, is shown.

The moulding device 10 comprises a revolving moulding drum assembly 1 and a stationary frame 2. Here, stationary frame is provided with wheels so as to be transportable, e.g. for cleaning purposes. During moulding, the wheels are fixed such that frame 2 is stationary. In stationary frame 2 a drive motor (not shown) is provided to drive the moulding drum assembly 1.

The shown revolving moulding drum assembly 1 comprises a rotating shaft 7, rotatably supported relative to the frame 2 via a rotary bearing assembly 6, so as to rotatably support the moulding drum assembly 1 about a longitudinal drum rotation axis RA.

Revolving moulding drum assembly 1 has a peripheral surface 3 in which multiple mould cavities 4 are provided, wherein the cavities each define a filling opening in the peripheral surface. The mould cavities are arranged in an array of parallel rows, here 5-6, extending in the direction of the rotation axis, and parallel series, here 7, extending in the peripheral direction.

Moulding device 10 further comprise a mass feed device 15 arranged in a filling position with respect to the peripheral surface of the moulding drum assembly. Here, the mass feed device 15 comprises a pump unit 16 to generate the pressurized mass of foodstuff, and a silo 17 for receiving the mass of foodstuff. These parts of the mass feed device are supported by a stationary frame 20. The mass feed device 15 further comprises an inlet member 18 for feeding a pressurized mass of foodstuff, and a shoe member 19 in communication with the inlet member 18.

The shoe member 19 comprises a filling mouth (not visible) which adjoins the peripheral surface of the moulding drum assembly in such a way that the filling opening of the one or more mould cavities which move past during rotation of the moulding drum assembly come into communication with said filling mouth in order to fill said cavities with the foodstuff as they move past. In operation, the pressurized mass of foodstuff introduced into a mould cavity causes an outward force onto said shoe member 19. The moulded food products are discharged via a discharge conveyor 8.

According to the present invention, the moulding device 10 further comprises a non-revolving component 25, concentrically supported by the moulding drum assembly 1 adjacent to and movable in a radial direction to the peripheral surface 3 thereof. Non-revolving component 25 comprises the shoe member 19 and interconnected moulding drum assembly engaging counterforce elements 26a, 26b, 26c, to counteract the entire outward force exerted by the pressurized foodstuff on the shoe member. In the shown embodiment 3 counterforce elements are provided, at opposite ends of the moulding drum assembly 1 and at a central part thereof. The mould cavities are here provided between the counterforce elements. The counterforce elements are provided radially opposite the shoe member, i.e. in the shown embodiment a segment with a counterforce element and the shoe member form a closed ring in cross-section.

An anti-torque member 27 is provided to prevent rotation of the non-revolving component 25. Here, anti-torque member 27 is embodied as a rod mounted to shoe member 19, which is provided with a slit for receiving a frame mounted pin 28, mounted onto stationary frame 2. The slit does not allow the non-revolving component 25 to rotate, but does allow flexibility in the radial direction. Hose 21 provided between shoe member 19 and inlet member 18 is provided as a non-force transmitting flexible connection between the shoe member 19 and the inlet member 18, such that force transmittal from the shoe member to the inlet member is not possible.

Figure 2:
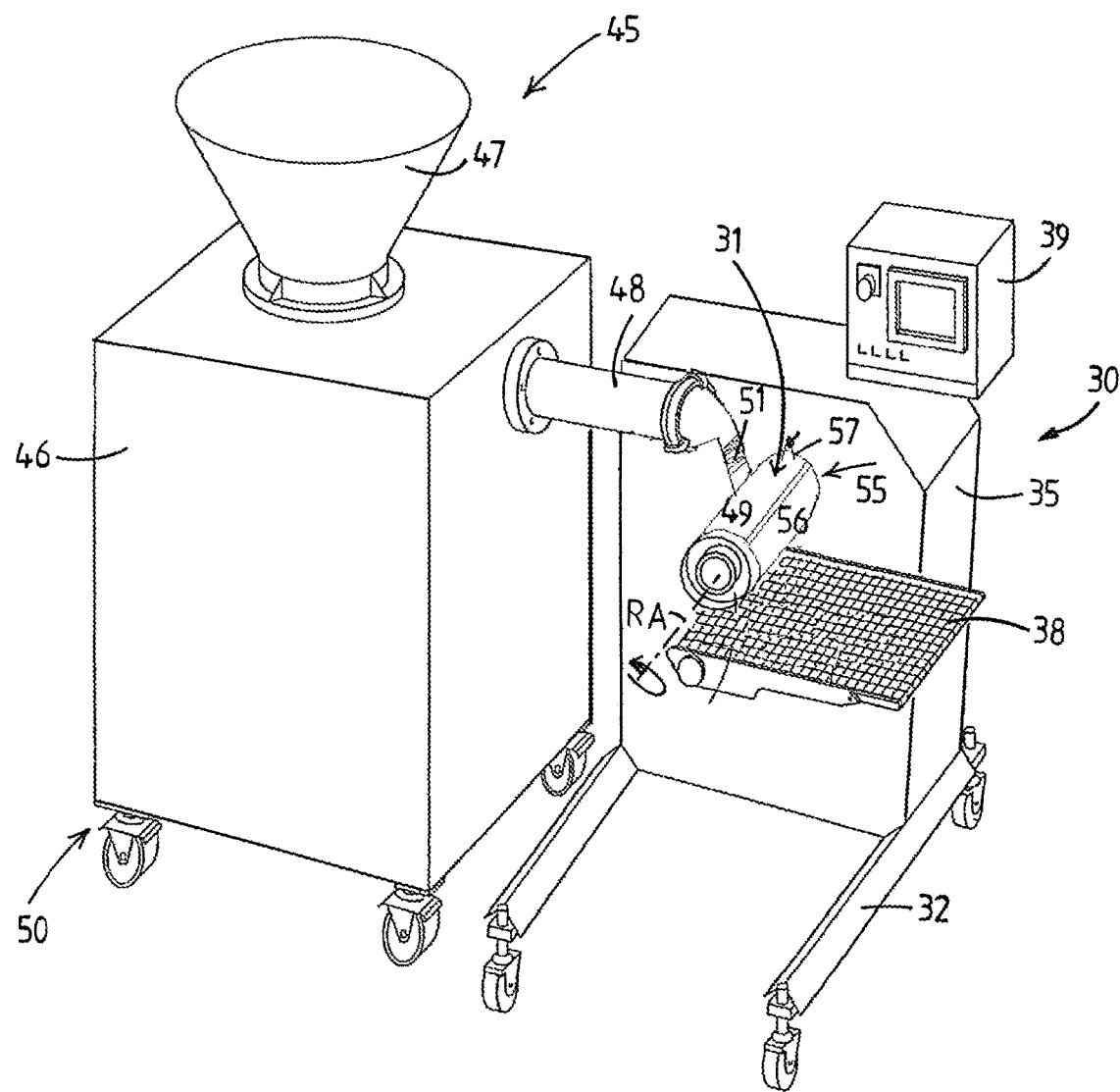
FIG. 2 is a perspective view of a second embodiment of a moulding device according to the present invention.

In FIG. 2 an alterative moulding device 30 is shown, for moulding food products from a mass of foodstuff which can be transferred by pumping. The moulding device 30 comprises a frame 32, which is provided with wheels so as to be transportable between a moulding location and a remote location, e.g. for storage or cleaning. During moulding food products, the frame 32 is provided stationary.

In the shown embodiment, frame 32 supports a drive motor 35 controllable by a control device 39 to drive moulding drum assembly 31. Not visible is a rotary bearing assembly supported by the stationary frame and rotatably supporting the moulding drum assembly about a longitudinal drum rotation axis RA.

Revolving moulding drum assembly 31 has a peripheral surface in which one or more mould cavities are provided, neither of which is visible in the shown embodiment. The cavities each define a filling opening in the peripheral surface.

The moulding device 30 further comprises a mass feed device 45 arranged in a filling position with respect to the peripheral surface of the moulding drum assembly 31. The mass feed device 45 comprises a pump unit 46 and a silo 47 supported by a frame 50, which in the shown embodiment is provided movable on wheels. During moulding the wheels are fixed such that frame 50 is stationary. The mass feed device further comprises an inlet member 48 for feeding a pressurized mass of foodstuff to a filling mouth (not visible) of a shoe member 49. in such a way that the filling opening of the one or more mould cavities which move past during rotation of the moulding drum assembly come into communication with said filling mouth in order to fill said cavities with the foodstuff as they move past.

The filling mouth of shoe member 49 adjoins the peripheral surface of the moulding drum assembly 31. The shoe member 49 is, according to the present invention, part of non-revolving component 55, concentrically supported by the moulding drum assembly 31 adjacent and movable in a radial direction to the peripheral surface thereof.

In operation, the pressurized mass of foodstuff introduced into a mould cavity causes an outward force onto said shoe member 49. According to the invention, said outward force is counteracted by an interconnected moulding drum assembly engaging counterforce element 56, which is connected to the shoe member 49 to form a closed ring-shaped non-revolving component 55. In the counterforce element, one or more discharge openings (not visible) are provided to discharge moulded products onto discharge belt 38.

An anti-torque member 57 is provided, comprising a hook connected to the non-revolving component 55 and a pin connected to the frame 32, here the drive motor 35, to prevent the non-revolving component 55 from rotating together with the moulding drum assembly 31. To allow some flexibility of the shoe member 49 in the radial direction, the hook is designed to allow some radial movement of the non-revolving component with respect to the pin.

In the shown embodiment, a non-force transmitting flexible connection 51 is provided between shoe member 49 and inlet member 48, such that shoe member 49 is provided telescopically with respect to the inlet member 48, allowing flexibility of the shoe member 49 with respect to the inlet member 48. This flexibility required as the shoe member is supported by the moulding drum assembly 31, and a rigid connection would result in undesired stresses and force transfer.

Figure 3C:
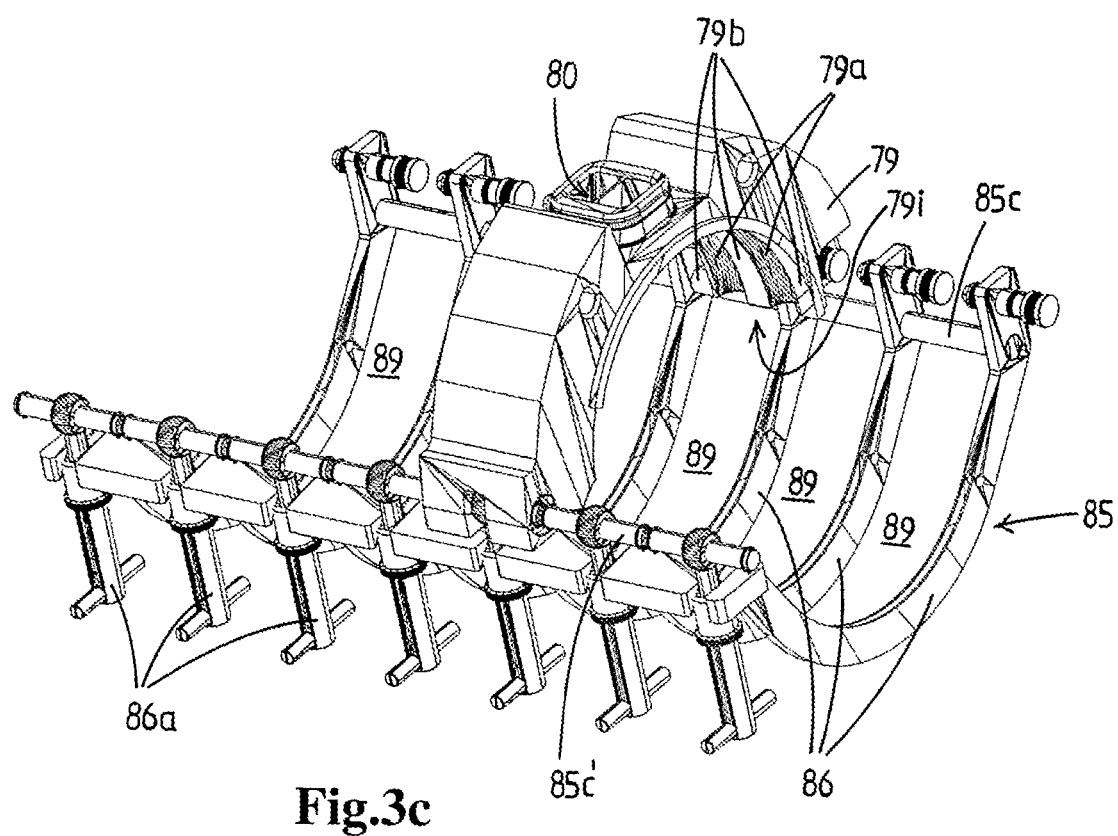

In FIGS. 3a-3c a third embodiment is shown of a revolving moulding drum assembly 61, rotatable about rotation axis RA, and a non-revolving component 85, which is shown per se in FIG. 3c.

The revolving moulding drum assembly 61 has a peripheral surface 63 in which multiple mould cavities 64 are provided. The cavities 64 each define a filling opening in the peripheral surface.

In particular, in the shown embodiment, the peripheral surface 63 of the moulding drum assembly 61 is embodied as a profiled peripheral surface. In another embodiment the peripheral surface could be entirely cylindrical with a constant diameter of its axial length. The cavities 64 are arranged in 14 series, at different peripheral positions when seen in peripheral direction of the moulding drum assembly. The cavities are, in this example, also arranged in 8 adjacent and parallel axial rows, when seen in the direction of the rotation axis RA. In another embodiment the cavities could be arranged in helical rows or in staggered rows as is known in the art.

The peripheral surface 63 has a non-cylindrical shaping profile which comprises, for each peripheral series of cavities 64 arranged at multiple peripheral positions when seen in peripheral direction of the moulding drum assembly, projections 63p. each Projection 63p is located between a pair of successive cavities 64 of said series. The projections 63p of a series protrude relative to a smaller diameter surface ring area 63g which extends in the peripheral direction about the drum. Between neighboring series of cavities 64 a surface ring area 63g is located.

Non-revolving component 85 is concentrically supported by the moulding drum assembly 31 adjacent and movable in a radial direction to the peripheral surface 63 thereof. In the shown embodiment it comprises multiple, here 7 shoe members 79, provided substantially parallel to and adjacent one another, viewed in the direction of the rotation axis. Each shoe member comprises a filling mouth which is in communication with an inlet member, here not shown, via a distributor 81. Each filling mouth 80 adjoins an associated section of the peripheral surface 63 of the moulding drum assembly in such a way that the filling openings of two mould cavities of adjacent series of mould cavities 64 which move past during rotation of the moulding drum assembly come into communication with said filling mouth in order to fill said cavities with the foodstuff as they move past.

Advantageously, the multiple shoe members 79 are provided floating in the direction of the rotation axis RA, such that each shoe member 79 is free to align itself relative to the moulding drum assembly, in particular relative to the projections 63p that correspond to a series of cavities 64, e.g. each shoe member 79 belonging to a single corresponding series of cavities 64.

Figure 5:
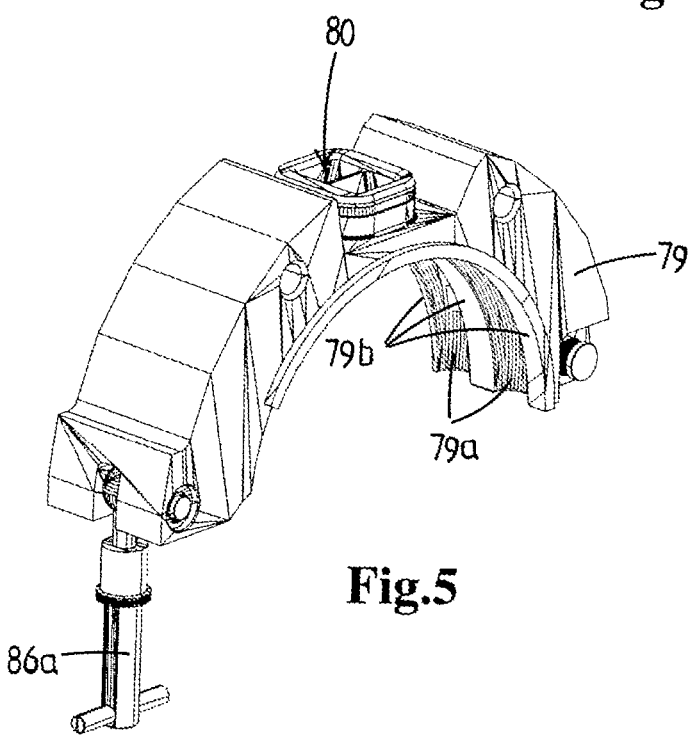
FIG. 5 shows a shoe member of a non-revolving component according to the embodiments of FIG. 3 and FIG. 4.

In the shown embodiment, an inner side 79i of each shoe member 79 which adjoins an associated section of the peripheral surface 63 of the moulding drum assembly is embodied as a profiled inner side having a profile which section comprises, for each series of cavities, one or more (here two as best seen in FIG. 5) peripheral grooves 79a extending in the peripheral direction and ribs 79b extending in the peripheral direction, which peripheral grooves 79a and ribs 79b are in meshing engagement with the profiled peripheral surface 63 of said section of the moulding drum.

The meshing engagement may include some play between the shoe member 79 and the drum surface 63 and projections 64 thereof.

According to the invention, in operation, a not-shown anti-torque member is provided to prevent rotation of the non-revolving component 85, which is advantageously connected to a stationary frame such that some radial flexibility is allowed.

As in particular visible in FIG. 3c, the non-revolving component 85 may comprise one or more connection beams 85c and 85c', extending parallel to the drum rotation axis RA. The 7 shoe members 79 are connected to this connection beams, in operation adjacent filling openings in the peripheral surface of the moulding drum assembly.

Furthermore, one or more moulding drum assembly engaging counterforce elements 86 may be connected to these connection beams 85c and 85c', extending remote from the filling openings, to counteract the outward force exerted by the pressurized foodstuff on the shoe member.

Here each counterforce element 86 is positioned radially opposite a corresponding shoe member, so that a pair of a shoe member and counterforce element forms an assembly that encircles the drum, viewed in the direction of the rotation axis RA. Each assembly of shoe member and counterforce element may be separate from neigbouring such assemblies if desired, or they may be interconnected via said one or more connection beams.

In particular, two counterforce elements 86 are positioned opposite each shoe member 79. Between two counterforce elements 86 is a discharge opening 89 for moulded products.

In the shown embodiment, the non-revolving component 85 comprises mounting tools 86a, to individually mount each shoe member 79 to the connection beam 85c'. This allows an expedient exchange of shoe members 79. In FIG. 5, the combination of mounting tool 86a and shoe member 79 is shown in detail.

Figure 4A:
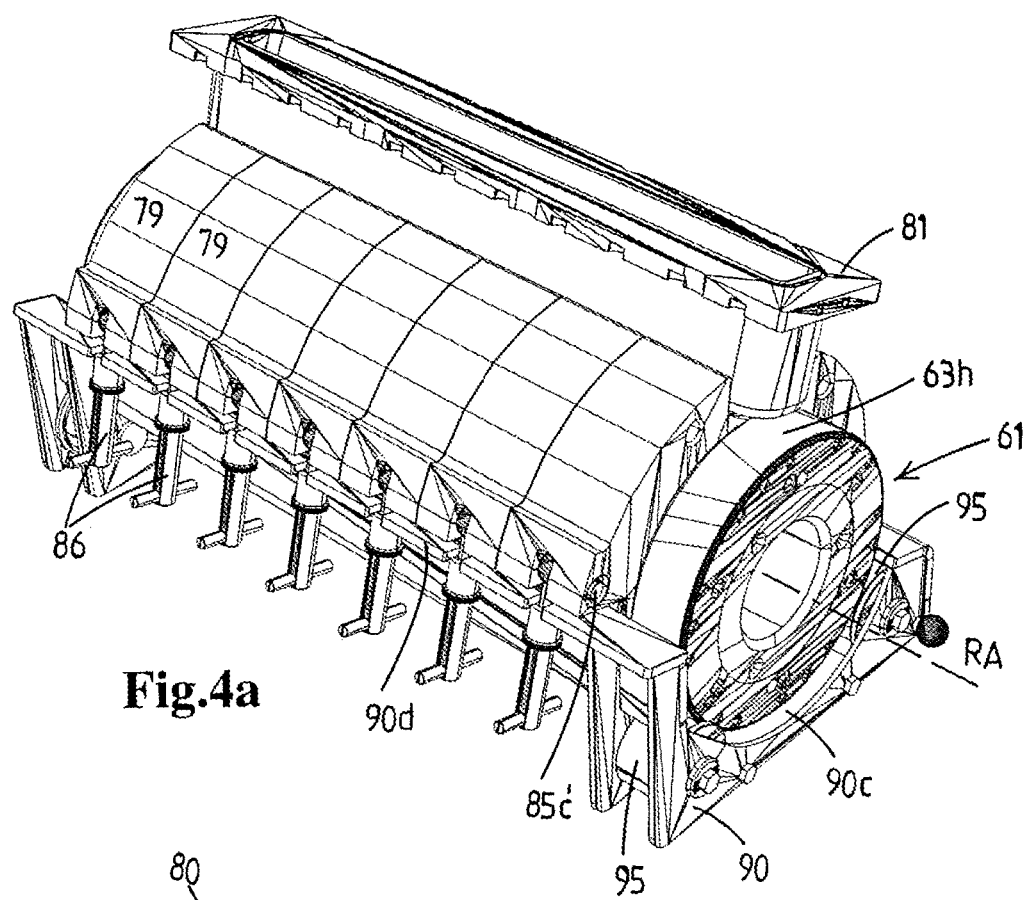
FIG. 4a is a perspective view of part of a fourth embodiment of a moulding device according to the present invention.
Figure 4B:
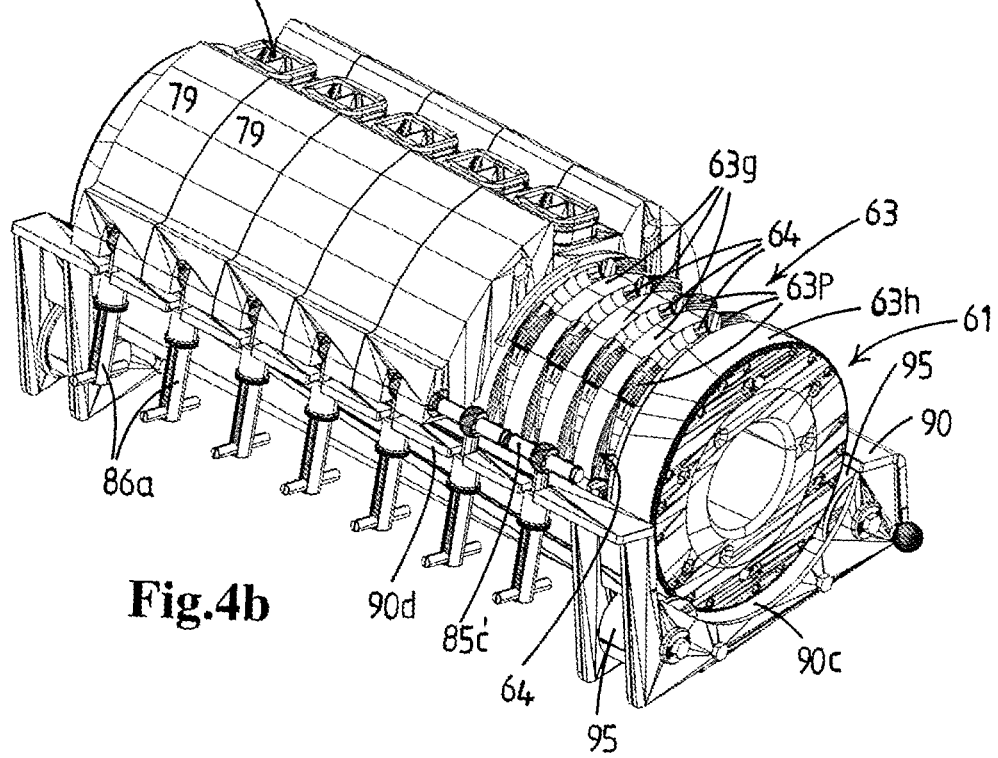
Figure 4C:
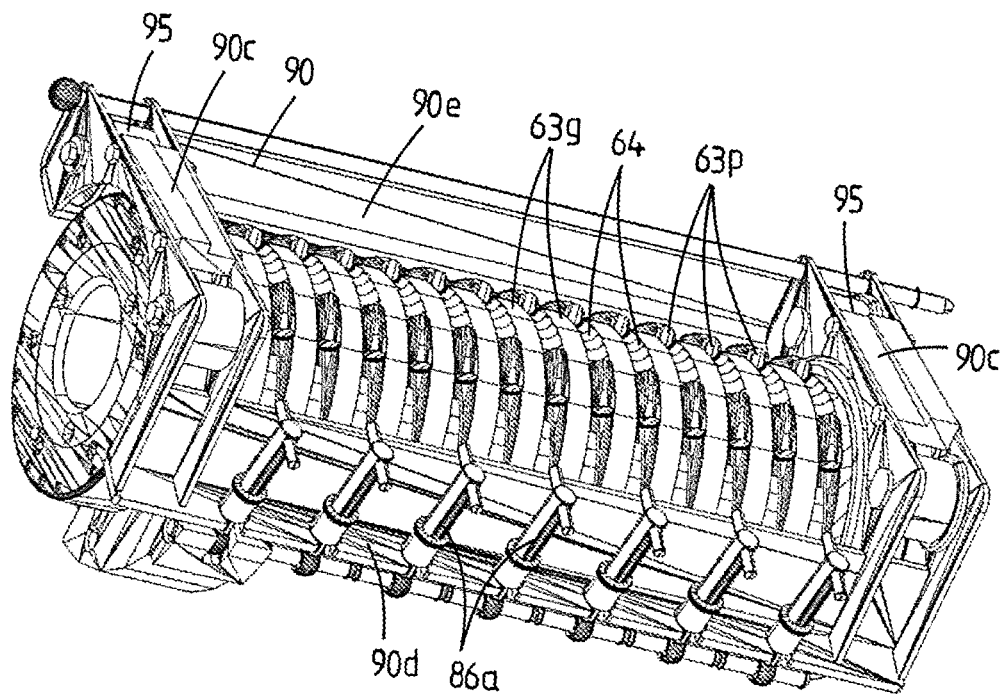
FIG. 4c shows the embodiment of FIG. 4a in a perspective view from below.

In FIGS. 4a-4c a fourth embodiment of part of a moulding device is partially shown. The shoe member 79 and mounting tool 86a of this fourth embodiment are the same as that of the third embodiment, and is thus not described in further detail. The same reference numerals have been used.

Also, the same revolving moulding drum assembly 61 is applied as in the third embodiment, given same reference numerals for the peripheral surface 63, mould cavities 64 etc. etc.

In the fourth embodiment, as in the third embodiment, the non-revolving component comprises a connection beam 85c', extending parallel to the drum rotation axis RA, to which the mounting tools 86a of multiple shoe members 79 are connected adjacent filling openings in the peripheral surface of the moulding drum assembly.

At the other end, the shoe members 79 in this fourth embodiment are connected to a beam 90e, extending parallel to drum rotation axis RA and connection beam 85c. This connection beam 90e is part of a connection subframe 90, to which also mounting tools 86a are mounted. To this connection subframe 90, at the end parts of the moulding drum, are two moulding drum assembly engaging counterforce elements 90c connected, adjacent the peripheral surface at the ends of the moulding drum assembly, remote from the filling openings. In this embodiment, rollers 95 are provided between the counterforce elements 90c and the moulding drum assembly 61. It is illustrated that the rollers 95 here comprise at each axial end of the drum a set of rollers 95, that roll on an axial end part 63h of the drum. As is preferred this end part 63h has a diameter equal or greater than the diameter of the drum surface provided with cavities 64, e.g. greater than the diameter defined by projections 63p of such a drum type.

Therefore FIGS. 4a-c illustrate an example of a combination of a revolving moulding drum assembly and an associated non-revolving component for use in a moulding device for the moulding of food products. Herein the drum assembly has a rotation axis and a peripheral surface in which mould cavities are provided, wherein the cavities each define a filling opening in the peripheral surface. The moulding drum comprises first and second end parts, here each embodied as a rotation symmetrical surface, at opposite axial ends of the peripheral surface in which mould cavities 64 are provided. The non-revolving component has a connection subframe with a first counterforce element 90c and a second counterforce element 90c at axial ends thereof. The subframe further comprises a first beam 90d along one side of the drum and a second beam 90e along the opposite side of the drum.

The first counterforce element 90c cooperates with the first end part 63h via a first bearing, here via two rollers that roll over a rotation symmetrical surface of the drum. The second counterforce element 90c cooperates with the second end part 63h via a second bearing, here via two rollers 95 that roll over a rotation symmetrical surface.

The subframe 90 carries the shoe members 79. For example one end of a semi-circular shoe member 79 is pivotally mounted to beam 90e, e.g. so as to allow for floating motion in direction of the beam, with the other end of the shoe member 79 being connected to the other beam 90d via a mounting tool 86a, e.g. so as to set a desired play between the shoe member 79 and the drum surface.

The invention claimed is:

1. A moulding device for moulding food products from a mass of foodstuff which can be transferred by pumping, comprising:
    a stationary frame supporting a rotary bearing assembly;
    a moulding drum assembly concentrically supported by the rotary bearing assembly and rotatable about a longitudinal drum rotation axis, the moulding drum assembly having a peripheral surface in which a plurality of mould cavities are provided, wherein the mould cavities each define a filling opening in the peripheral surface;
    a drive motor to drive the moulding drum assembly;
    a mass feed device arranged in a filling position with respect to the peripheral surface of the moulding drum assembly, the mass feed device comprising:
    an inlet member for feeding a pressurized mass of foodstuff;
    a shoe member and a counterforce element that is connected to the shoe member together forming a non-revolving component which is concentrically supported by the moulding drum assembly and not by the stationary frame, the non-revolving component engaging the moulding drum assembly and being movable in a radial direction to the peripheral surface of the moulding drum assembly; and
    an anti-torque member to prevent rotation of the non-revolving component, while allowing flexibility in the radial direction;
    wherein the shoe member is in communication with the inlet member of the mass feed device,
    wherein a non-force transmitting flexible connection is provided between the shoe member and the inlet member, such that force transmittal from the shoe member to the inlet member is not possible, wherein the shoe member comprises a filling mouth which adjoins the peripheral surface of the moulding drum assembly in such a way that the filling opening of each of the plurality of mould cavities which move past during rotation of the moulding drum assembly come into communication with said filling mouth in order to fill said mould cavities with the foodstuff as they move past, wherein, in operation, the pressurized mass of foodstuff introduced into a mould cavity causes an outward force onto said shoe member, and wherein the counterforce element engages the moulding drum assembly, counteracting the entire outward force exerted by the pressurized foodstuff on the shoe member.

2. The moulding device according to claim 1, wherein the shoe member and the counterforce element are positioned radially opposite one another.

3. The moulding device according to claim 1, wherein the shoe element and the counterforce element are positioned in line with each other, viewed in the direction of the rotation axis, wherein the counterforce element is provided with a discharge opening for moulded products.

4. The moulding device according to claim 1, wherein the non-revolving component comprises multiple shoe members, provided substantially parallel to and adjacent one another, in the direction of the rotation axis, wherein each shoe member comprises a respective filling mouth adjoining an associated section of the peripheral surface of the moulding drum assembly, and wherein, in each of the associated sections, a series of cavities is arranged at multiple peripheral positions when seen in peripheral direction of the moulding drum assembly.

5. The moulding device according to claim 4, wherein the peripheral surface of the moulding drum assembly is embodied as a profiled peripheral surface having a profile which comprises, for each of said associated sections:

projections, each projection between a pair of cavities of each section, and/or one or more peripheral grooves which extend in the peripheral direction between the successive series of cavities, and wherein an inner side of each shoe member which adjoins the associated section of the peripheral surface of the moulding drum assembly is embodied as a profiled inner side having a profile, which section comprises one or more grooves extending in the peripheral direction and/or ribs extending in the peripheral direction, which grooves and/or ribs are in meshing engagement with the profiled peripheral surface of said associated section of the moulding drum assembly.

6. The moulding device according to claim 5, wherein the non-revolving component comprises connection beams extending parallel to the drum rotation axis, to which the multiple shoe members are connected adjoining the filling openings in the peripheral surface of the moulding drum assembly, and to which connection beams the counterforce element is connected.

7. The moulding device according to claim 4, wherein the non-revolving component comprises connection beams extending parallel to the drum rotation axis, to which the multiple shoe members are connected adjoining the filling openings in the peripheral surface of the moulding drum assembly, and to which connection beams the counterforce element is connected.

8. The moulding device according to claim 1, wherein the peripheral surface of the moulding drum assembly is embodied as a profiled peripheral surface with sections of the peripheral surface, wherein series of cavities are arranged at multiple peripheral positions when seen in a peripheral direction of the moulding drum assembly, and wherein the profiled peripheral surface has a profile which comprises, for each of the sections, projections, each projection between a pair of cavities of each section, and/or one or more peripheral grooves which extend in the peripheral direction between the successive series of cavities.

9. A method for moulding food products from a mass of foodstuff which can be transferred by pumping, said method comprising the step of using the moulding device according to claim 1.

* * * * *